US005743407A

United States Patent [19]

Williams

[11] Patent Number: 5,743,407

[45] Date of Patent: Apr. 28, 1998

[54] COLOR REFERENCE SYSTEM FOR DECORATORS

[76] Inventor: Martha Williams, 600B N. Main St., Alpharetta, Ga. 30201

[21] Appl. No.: 564,565

[22] Filed: Nov. 29, 1995

[51] Int. Cl.$^6$ .......... G09B 25/00

[52] U.S. Cl. .......... 206/575; 206/81; 206/459.5; 434/75

[58] Field of Search .......... 206/38, 81, 214, 206/223, 224, 232, 459.1, 459.5, 575, 1.7–1.9; 434/72, 75, 79, 80, 84, 96–98

[56] References Cited

U.S. PATENT DOCUMENTS

| | | | |
|---|---|---|---|
| 754,852 | 3/1904 | Crawford | 206/214 |
| 757,549 | 4/1904 | Gould | 206/81 |
| 786,210 | 3/1905 | Gould . | |
| 856,222 | 6/1907 | Church . | |
| 917,393 | 4/1909 | Wiggin . | |
| 926,436 | 6/1909 | Pearson . | |
| 989,406 | 4/1911 | Pearson | 434/79 |
| 1,111,320 | 9/1914 | Pearson | 434/75 |
| 1,246,076 | 11/1917 | Fairbanks | 434/79 |
| 1,247,160 | 11/1917 | Senseney | 434/98 |
| 2,155,924 | 4/1939 | Barrett et al. . | |
| 2,291,257 | 7/1942 | Rider . | |
| 2,294,131 | 8/1942 | Raymond . | |
| 2,300,360 | 10/1942 | Remmers . | |
| 2,481,672 | 9/1949 | Kanaske . | |
| 3,559,306 | 2/1971 | Winans . | |
| 4,379,696 | 4/1983 | Lerner . | |
| 4,457,718 | 7/1984 | Lerner . | |
| 4,584,042 | 4/1986 | Wandroik | 434/84 |
| 4,992,050 | 2/1991 | Edwards . | |
| 5,036,973 | 8/1991 | Aida | 206/224 |

FOREIGN PATENT DOCUMENTS

| | | | |
|---|---|---|---|
| 0226174 | 12/1959 | Australia . | |
| 213349 | 4/1924 | United Kingdom | 434/79 |
| 0436601 | 10/1935 | United Kingdom . | |
| 509286 | 7/1939 | United Kingdom | 206/81 |
| 1386888 | 8/1973 | United Kingdom | 434/98 |

*Primary Examiner*—Jimmy G. Foster
*Attorney, Agent, or Firm*—Morris, Manning & Martin, L.L.P.

[57] ABSTRACT

A color reference system for correlating colors to decorating parameters for an area. The system includes a color reference card for storage of a color sample and an associated identifier for correlating the color sample to an identifier. Area reference cards for different rooms or locations include decorating parameters such as primary, accent, and accessory color identifiers. When a color sample corresponds to a decorating parameter for a location, its identifier is recorded in association with the decorating parameter. The system may be transported to a decorating or paint store for efficient reference. By looking at a decorating parameter for an area and using the color identifier to find the color sample on the color reference card, a user can quickly find a color sample for comparison purposes without carrying color palettes having color samples which do not correspond to colors in an area to be decorated.

9 Claims, 5 Drawing Sheets

COLOR REFERENCE SYSTEM FOR DECORATORS

FIELD OF THE INVENTION

This invention relates to decorating, and more particularly, to color reference systems which permit a decorator to transport samples of colors used in a home or building to a store for reference in making color coordinated purchases.

BACKGROUND OF THE INVENTION

Interior and exterior decorators strive to select paint, wallpaper, fabric, furnishings, and other decorations that match or complement one another. In making their selections, decorators must correlate items or colors in the area to be decorated with paints, wallpapers, fabric, furniture or other decorations which are usually located away from the home or building to be decorated. Thus, decorators need an accurate reminder of the colors and textures that are to be matched or complemented.

To facilitate the selection process, a number of devices have been developed by vendors of decorating items. For example, paint stores may provide a collection of paper strips bearing multiple samples of paint color shades with each shade identified by a number or name. These paper strips are usually joined by a rivet or the like at one end to avoid loss of the strips. Such a collection is sometimes called a color palette. To select a paint, one takes the palette to the area to be painted and juxtaposes the color samples of the paper strips to items within the area to determine what colors best match or complement the items in the area. The selected colors are usually remembered by making a mark next to the sample on the ship or by writing down the identifying name or number of the sample on a note. In a similar manner, wallpaper and upholstery stores also provide sample books to customers so they may take a collection of what the store can provide to the area to be decorated so a purchasing decision can be made.

These devices for taking a collection of samples to an area to be decorated suffer from a number of limitations. For one, the paint palettes are usually provided by each manufacturer for the manufacturer's paint only. Thus, if a consumer wants to consider more than one paint manufacturer then multiple palettes must be obtained. Another limitation arises from the number of materials that must be consulted to make a purchasing decision. For example, after a paint shade selection has been made, a consumer or decorator must carry the palette and notes for consultation. The notes must be referenced to recall the shade selected and then the color found in the palette to compare the shade to the item being evaluated. If either the notes or palettes are lost then the selection process must begin again.

Attempts to solve these problems are disclosed in a number of patents. For example, U.S. Pat. No. 3,559,306 to Winans discloses a color reference book which includes pictures of portions of a house and pages of a color palette having color samples with removable sections. Once a color sample is determined to match an element depicted in one of the pictures, the removable section of the sample is detached and placed in a slot adjacent to the element in the picture. A transparent cover helps hold the sample section in place. Once mounted, a user takes the book to a store and turns to the page for the portion of the house that needs to be consulted for a purchase decision. No reference to the color palette section of the book need be made.

While the book of Winans reduces the need to consult with the color palette, it still suffers from a number of limitations. For one, the color palette remains part of the book even though it is not required to make a decision. Another limitation is the use of pictures which may or may not correspond to a user's home, room or office. Another limitation of the Winans reference book is that once the removable section of a sample is detached, the color may no longer be used for other rooms or building portions depicted in the pictures without adding more samples to the book which make the book bulky and inconvenient to use.

Another attempt to facilitate color consultation is shown in U.S. Pat. No. 4,992,050 to Edwards. That patent discloses a color reference kit having a plurality of color selection cards. The cards have a plurality of shades for a primary color arranged in horizontal rows. The rows are separated by perforations so that a row or card section may be separated from the kit for transportation. Thus, this kit reduces the need to carry colors from the palettes which are not used at the user's home, room, or office. However, such a kit still requires the user to compile notes which correlate a particular color on a separated row with a particular item or place in the area to be decorated. As a result, the notes and the selected colors may be separated and the reference value of either is destroyed. Additionally, such a kit does not facilitate the taking of notes which may be helpful in correlating the colors in the area to be decorated to decorating items since the user must make the notes on their own. Thus, a knowledgeable store attendant may ask questions regarding known selection criteria which may aid in the purchase decision. However, the user's notes may not provide enough information for an answer. The user can then either guess or return to the area to be decorated to ascertain the answer.

What is needed is a decorator reference system that correlates a color from a palette to an area to be decorated without requiring that any extraneous colors be retained in the system. What is needed is a system that permits a color in a palette to be correlated to more than one area to be decorated. What is needed is a system that permits a user to easily integrate colors from the area to be decorated with notes correlating the colors to the area. What is needed is a system that assists a user in collecting notes about the use of colors in an area to be decorated.

SUMMARY OF THE INVENTION

The above-noted problems in color reference systems are solved by a color reference system made according to the principles of the present invention. The inventive system includes a plurality of color reference cards for correlating a color sample to a color identifier and an area reference card for correlating a decorating parameter to the color identifier on the color reference cards so that the color sample on the color reference card may be correlated to multiple decorating parameters without requiring multiple samples of the color sample. The color samples on a color reference card may be supplied from a color palette so a user only needs the color samples from a palette or the like which are actually used in an area to be decorated. These samples may then be correlated to many areas by using the color identifier only. Such a system reduces the need for transporting other color samples with the system and does not require many samples of the same color for repetitious use of a color throughout a building or other area.

Preferably, the area reference card has a plurality of spaces with each space having an identifier for a decorating parameter such as furniture, accessories, wall, and floor colors. Each space may be provided with an identifier that correlates the decorating parameter to a color sample. The preferred embodiment further includes a plurality of area reference cards so multiple areas in a home or office may be included in the system. The decorating parameters defined on the area reference card also assist a user in taking notes for an area. For example, an area reference card preferably includes decorating parameters for a primary and an accent color. These parameters may be helpful in selecting items for a room.

Preferably, the color reference system of the present invention includes a wallet for holding a plurality of color reference cards and area reference cards in a portable and organized fashion. Most preferably, the color reference and area reference cards are provided on an accordion fold-out card to facilitate the storage and retrieval of the color reference cards and area reference cards in the wallet. Most preferably, the wallet is provided with a pocket which extends the length of the wallet for the storage of fabric and wallpaper. Preferably, a divider separates this storage pocket into a compartment for fabric samples and a compartment for wallpaper samples.

In another alternative embodiment, a trifold binder is provided with a tablet and writing instrument on the inner surface of one plane of the trifold, a plurality of transparent sleeves, each marked with a room identifier, is provided on the inner surface of one plane of the trifold, and at least two transparent pockets are provided along the third surface. One of the transparent pockets is preferably sized to hold area reference and color reference cards and the second pocket is preferably sized to hold an identification card and scissors. The transparent sleeves may hold fabric and wallpaper samples so they may be organized by room for easy reference. The trifold binder is preferably sized to fit within a purse or jacket pocket for easy transportation.

Another alternative embodiment of the present invention provides the color reference system in a computer. In that embodiment, a handheld computer with a display is provided for storing a color identifier provided with a color sample in association with an area identifier. By retrieving the area identifier, an associated color identifier may be used to identify the corresponding color sample. Alternatively, the computer may generate the samples and display or print them with a color identifier.

These and other objects and advantages of the present invention will become apparent from the drawings and the detailed description provided below.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
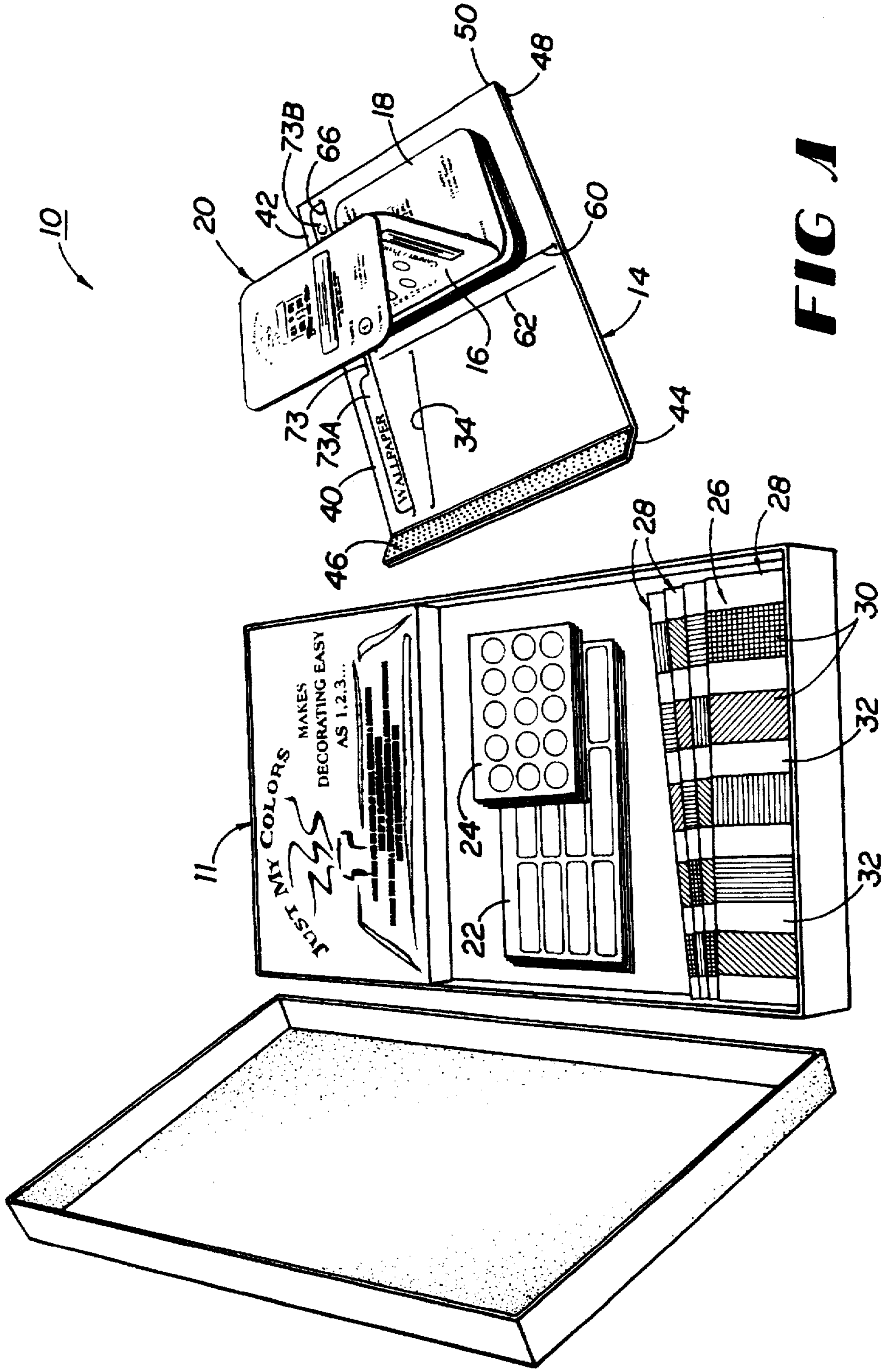
FIG. 1 shows a kit for implementing the color reference system of the present invention.

FIG. 1 depicts components of a preferred embodiment of a color reference system 10 and the preferred kit components 11 used to implement the color reference system 10 of the present invention. The kit components 11 and color reference system 10 are organized in a box 12 or the like. The system 10 includes a wallet organizer 14 for holding area reference cards 16 and color reference cards 18. The area reference cards 16 and color reference cards 18 are preferably provided on opposing sides of an accordion fold-out card 20, although they may be provided on individual cards stored in pocket 34 which may be located in either of opposing faces of wallet 14 or both. The kit components include room identification label sheets 22, sample number label sheets 24, and a color palette 26 comprised of a plurality of color and wood tone sample palette strips 28. The palette strips 28 are comprised of color samples 30 which are separated from one another by border areas 32.

In more detail, wallet organizer 14 is preferably a bifold wallet having opposing surfaces 40, 42. A securing tab 44 is located at an outboard end of fold 40. Tab 44 has a mating surface 46 of a hook and pile fastener mounted on its inner surface. The other portion of the hook and pile fastener 48 is mounted to the outside surface of fold 42. This structure permits wallet 14 to be folded so opposing surfaces 40, 42 overlie one another and tab 44 may be folded over the outside edge 50 of fold 42 to secure wallet 14 in a closed position.

Wallet 14 is preferably provided with pocket 66 which extends the length of wallet 14 for holding label sheets, fabric or other material samples, or any notes or other items a user may desire to carry for reference. Most preferably, pocket 66 is divided into two compartments 70, 72 by a tabbed divider 73. The tabs **73*a*, 73*b* are marked with indicia "Wallpaper" and "Fabric" to facilitate access to the appropriate compartment. Divider 73 is also provided with ledger indicia 74*c* so a user may log material purchases. Preferably, the ledger indicia includes a column for source of the material, the pattern name, and its price. Pocket 34 is preferably provided to hold color and woodtone sample number label sheets, accessory sample number label sheets, and clear sample label sheets. A slit 60 is aligned with and proximate to fold 62 for securing a mounting tab for accordion card 20. Wallet 14 is preferably sized to fit in a purse or person's pocket. While wallet 14 is shown as a bifold and is preferably sized for convenient carrying, one should appreciate that wallet 14** may be a trifold wallet, a book-type binder or other equivalent vehicle for carrying cards or the like.

Figure 2A:
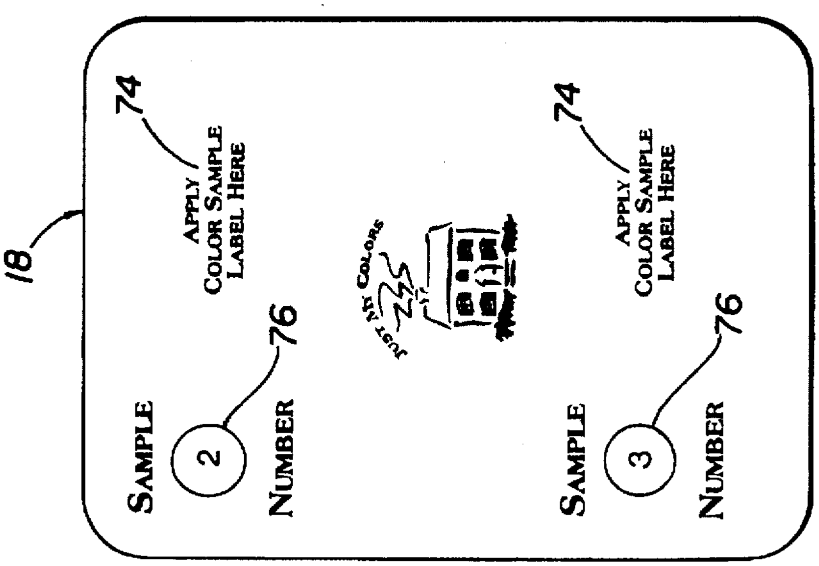
FIGS. 2A and 2B show an exemplary color sample reference card and an area reference card, respectively.
Figure 2B:
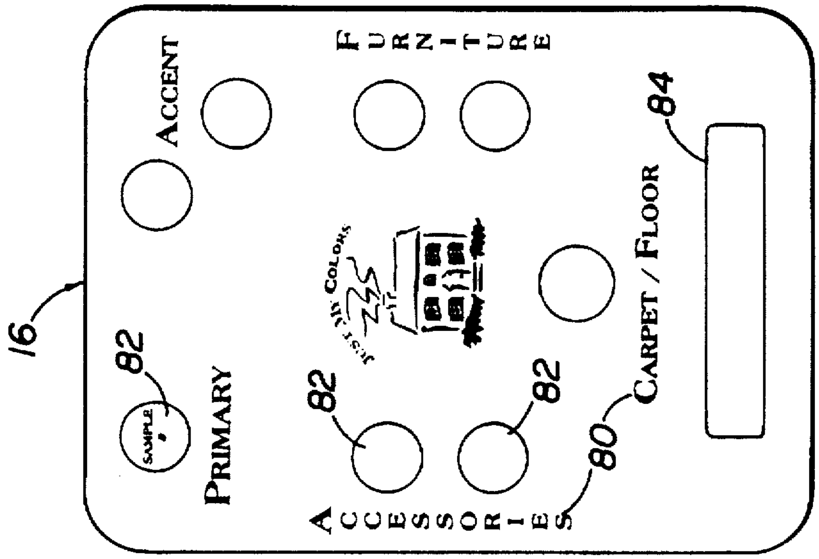
Figure 3:
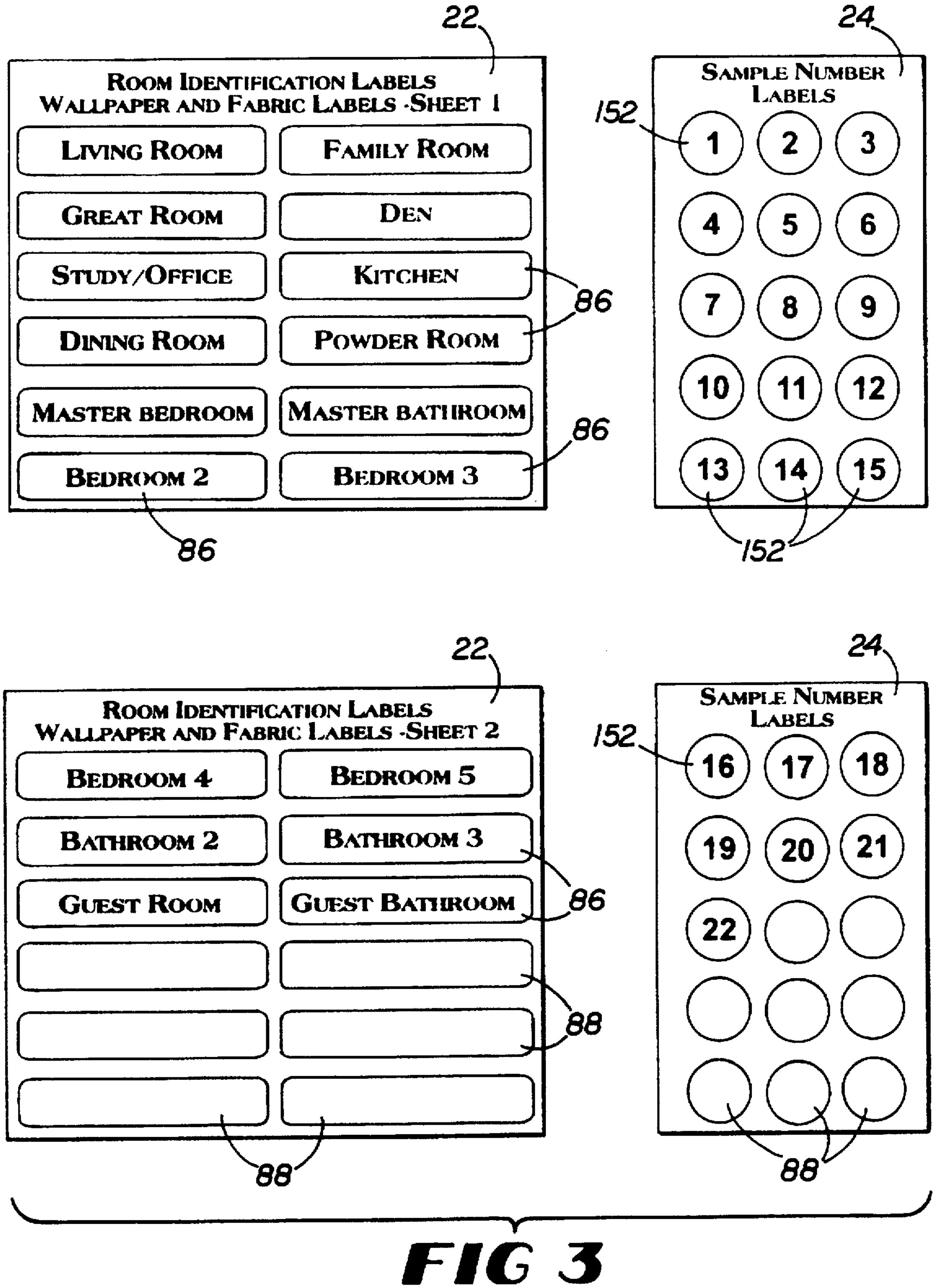
FIG. 3 shows exemplary label sheets which may be provided in the kit of FIG. 1 to facilitate use of the system of the present invention.

FIGS. 2A and 2B show the preferred color reference cards 18 and area reference cards 16, respectively. The color reference card 18 includes spaces 74 for affixing one or more color samples to the card. Proximate each space 74 is an area 76 where an identifier may be recorded which identifies the color sample affixed to a space 74. Preferably, cards 18 are preprinted with the sample identifiers. As shown in FIG. 3, a sample label sheet 24 may be provided having peel-off labels 152 which bear identifiers which may be numbers, letters, or other designators. These labels 152 may be affixed proximate to a space 74 to correlate a number on a label 152 to a color sample, if the color identifier is not preprinted on card 18. Alternatively, a user could simply record, by writing or the like, a color identifier on card 18 proximate each affixed color sample as long as each identifier is unique.

As seen in FIG. 2B, area reference card 16 preferably includes predefined decorating parameters 80 and areas 82 for defining a color identifier. For example, the predefined decorating parameters 80 in FIG. 2B include a room's primary color, an accent color, accessory color, furniture color and carpet/floor color. These parameters are merely exemplary and other parameters may be defined on an area reference card or areas for undefined decorating parameters may be provided so users may define their own parameters. The areas 82 on the card 16 adjacent these parameters are used to record color identifiers of the color samples and accessory finishes which correspond to a decorating parameter 80. For example, the dominant color for a room may be a particular shade of blue which corresponds to a color sample affixed to a color reference card 18 with corresponding identifier of "5". A label bearing the indicia "5" may then be applied to the area 82 adjacent the "Primary" decorating parameter of card 16. In this way, a user records the correlation of the primary color used in a particular room with the color sample of blue identified by "5" on one of the color reference cards 18. If that same shade of blue is used elsewhere for another decorating parameter, the indicia "5" need only be recorded proximate the parameter on the same or different area reference card to record the correlation. As a result, only the color samples actually needed from color palette 26 are recorded in system 10 and they may be correlated multiple times with different decorating parameters without requiring additional color samples. Because fewer color samples are needed and the samples used are efficiently correlated to decorating parameters, the system 10 may be used to provide more information for more rooms or areas than previously known systems and yet still remain portable and convenient to carry.

The area reference card 16 of FIG. 2B preferably includes an area 84 allocated for defining the room location of the decorating parameters 80. The location identified may be written on the card by the user or one of the labels 86 from a room identification label sheet 22 (FIG. 3) may be affixed to the card. Again, the location identifiers shown in the figure are exemplary only and other locations used in homes, offices or other decorating areas may be used. For versatility, blank labels 88 are also preferably provided on both the room identification label sheets 22 and the sample number label sheets 24 so the decorator may generate custom labels.

Figure 2C:
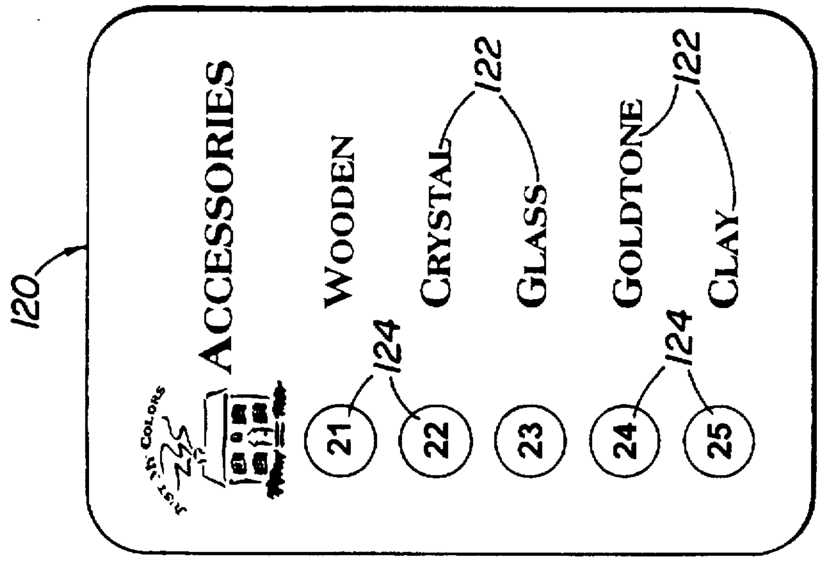
FIG. 2C shows an exemplary accessory color card of the present invention.

FIG. 2C shows an accessory color reference card 120. That card includes predefined identifiers 122 for typical accessory finishes. These finishes typically do not vary widely in tone or hue. Thus, the word identifier sufficiently denotes the finish without requiring a sample. Each word identifier has a correlated number identifier which is preferably printed in reverse of the color sample preprinted number identifiers. For example, the exemplary accessory number identifiers of FIG. 2C are printed as black numbers on white backgrounds and the color identifiers of FIG. 2A are printed as white numbers on black backgrounds. Because the accessory color reference cards 120 are preferably located at the rearward end of accordion card 20, all of the accessory hues are provided in the system 10. Preferably, to differentiate the accessory hues used in an area to be decorated from those not used, the number labels 152 are affixed over the number identifiers 124 on card 120. By using the reverse color scheme for the number labels and accessory number identifiers, a user can distinguish accessory colors used in an area to be decorated at a glance. The accessory and color tone identifiers may be used on one or more area reference cards 16 to provide a correlation between an item in a particular area and the corresponding color tone or accessory color on a color reference card 180 or accessory reference card 120.

The label sheets 22,24 shown in FIG. 3 are exemplary and are provided to facilitate use of the color sample, area reference, and accessory color cards. The room identification labels 86 may be applied to area reference cards 16 or to wallpaper or fabric samples to identify the room for a particular card or sample. As explained above, sample number labels 152 may be used to distinguish accessory hues actually used from those not used in an area to be decorated and to provide a legible identifier for a sample on a color sample card. Additionally, blank labels 88 are provided so a user may create their own number and room identification labels.

Figure 4:
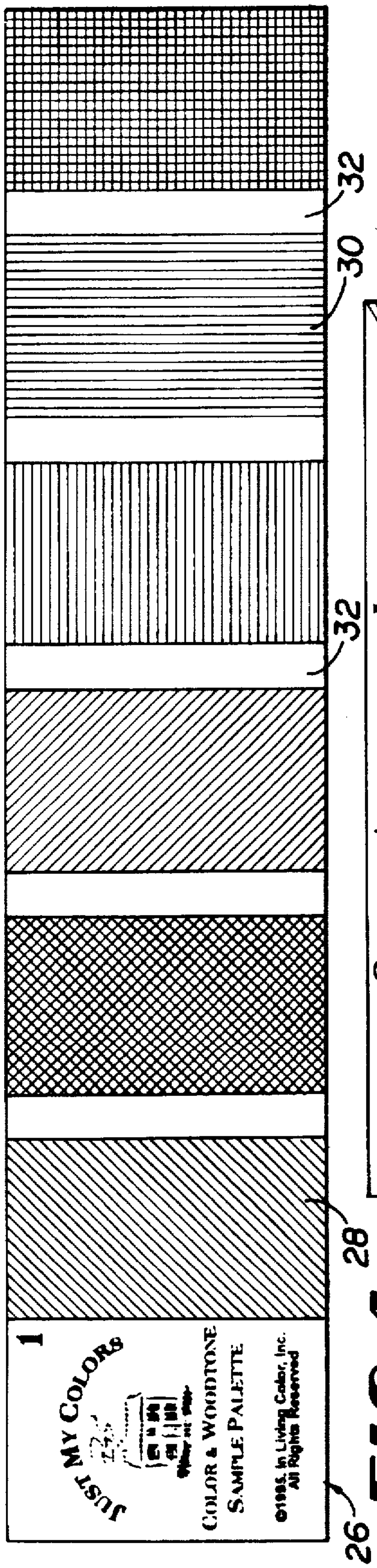
FIG. 4 shows a color palette strip which may be provided in the kit of FIG. 1 to facilitate use of the system of the present invention.
Figure 6:
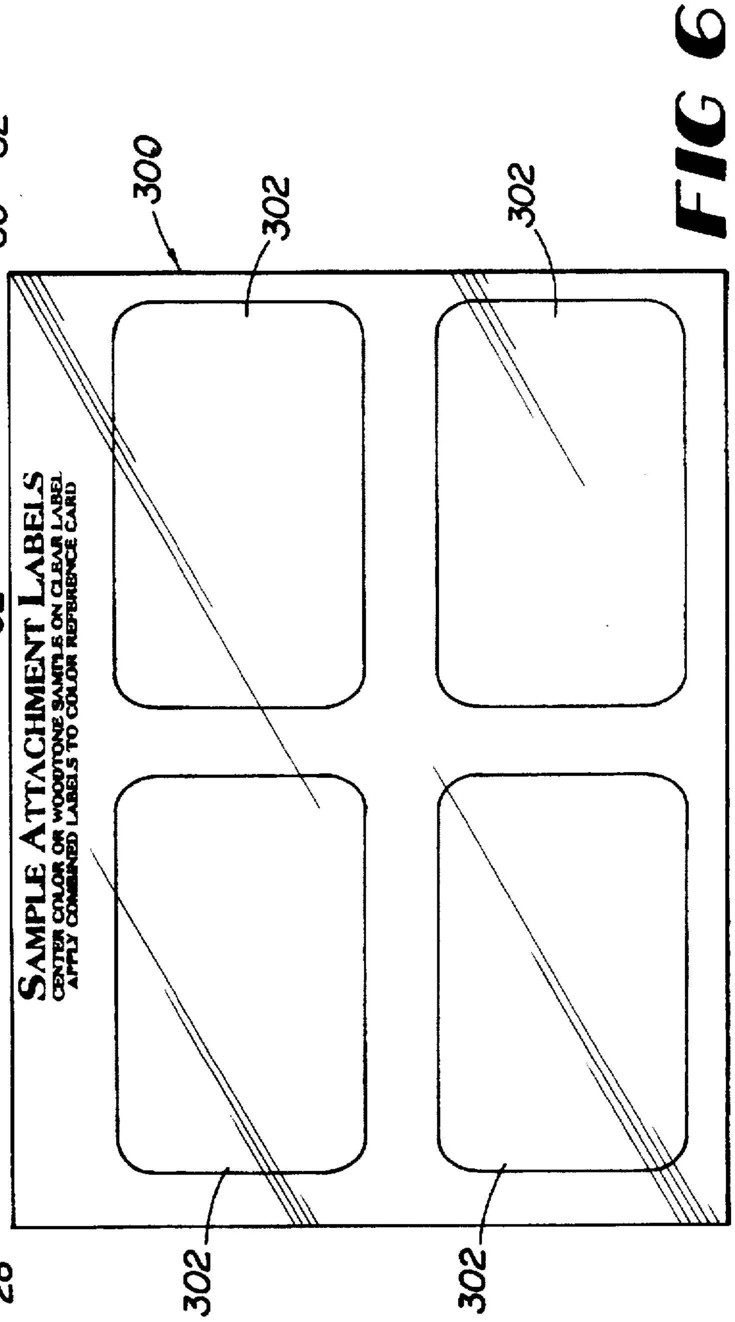
FIG. 6 shows an exemplary sheet of sample attachment labels which may be used to affix color samples to the color sample reference card of FIG. 2A.

Preferably, the strips comprising palette 28 (FIG. 4) provide color samples for matching colors to items in an area to be decorated. The color samples 30 are preferably separated by borders 32 and organized into general groups of shades on each palette strip 28. Preferably, strips 28 include not only shades and hues of solid colors, but also include wood tones and metal finishes to represent furniture and other accessories which may be located in an area to be decorated. Thus, the colors provided by palette 28 are not limited to those available from a particular manufacturer. In a preferred embodiment, perforations separate color labels 30 so they may be easily detached. Alternatively, scissors or the like may be used to cut the samples 30 from palette strip 28. The samples 30 may then be affixed to a color reference sheet 18 by applying an adhesive to the back of the sample or a clear peel-off label with an adhesive layer may be supplied in the kit and used to affix sample 30 to a color reference card 18. For color samples so removed from palette 28, the kit components 11 preferably include the sample attachment labels discussed above. Most preferably, color samples 30 are mounted with a peel-off adhesive to label stock so they may be removed from a palette strip 28 and adhered to an area reference card 16.

Figure 5:
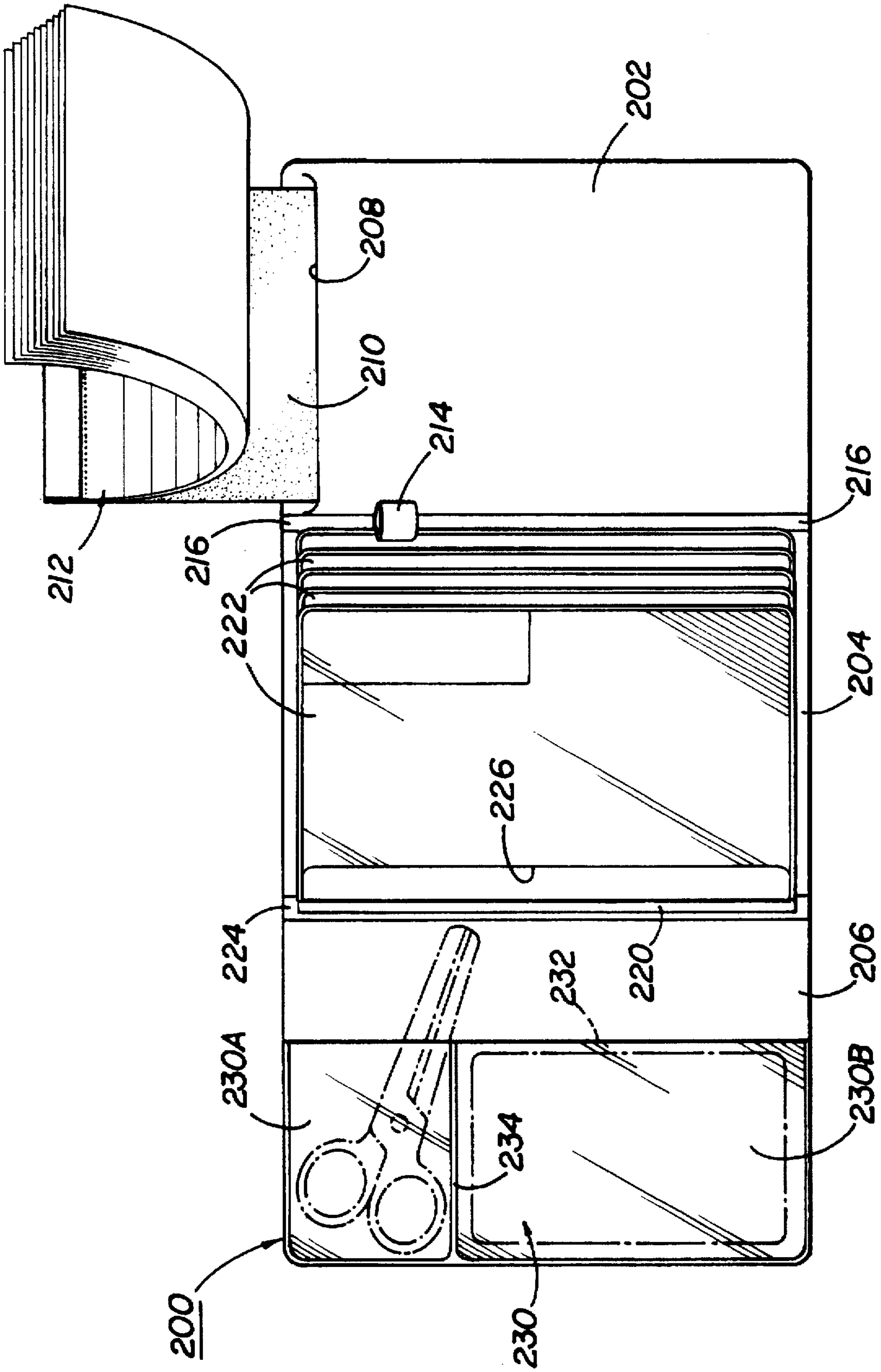
FIG. 5 shows a preferred embodiment of the system housed in a trifold binder.

A preferred embodiment of color reference system 10 is shown in FIG. 5. That system is a one-piece trifold binder 200 having surfaces 202, 204, and 206. Proximate the upper end of surface 202 is a slit 208 which accommodates the backing 210 of a tablet 212. A mounting tab 214 is provided in field 216 between surface 202, 204 for a writing instrument such as a pen or the like. A binder 220 joining a plurality of plastic sleeves 222 is mounted along field 224 by an adhesive or heat seal so the plastic sleeves 222 overlay surface 204. The plastic sleeves are provided with an opening 226 which preferably runs the length of a sleeve so materials may be placed in each sleeve. The sleeves are preferably marked with an area identifier to identify the location of the room from where the sample was taken. A clear plastic sheet 230 which is approximately two-thirds the width of surface 206 is mounted, by adhesive or heat seal, to the top, bottom, and outboard edge of surface 206 to form a pocket 232. Pocket 232 is preferably divided by adhering or heat sealing a line 234 across sheet 230. Upper pocket 232A is preferably sized to hold an identification card and a small pair of scissors. Lower pocket 232B is sized to hold area reference cards 16, color reference cards 18, and accessory color reference cards 120.

Finally, a sample attachment label sheet 300 is preferably provided with kit 11. The sheet 300 includes sample attachment labels 302 which are preferably clear labels with a reusable adhesive coated on the underside of the labels. These labels may be removed from sheet 300 and, by holding the outboard ends, a user may align an attachment label over a detached color sample and lower the label so the adhesive on its lower surface adheres to the color sample. The user may then move the attachment label and color sample over a color sample card 18 and affix the sample to the card by pressing the outboard ends against the card so the adhesive on the outboard ends adheres to the card and secures the sample to the card.

In use, a decorator uses color palette 26 to find color samples 28 which match colors of decorating parameters such as walls, furniture or other items in an area to be decorated. The matching color samples are detached from the strips and affixed to a color reference card 18. Proximate each affixed sample, a color identifier is recorded, if one is not preprinted on the color reference card 18. The color identifier is also recorded proximate a decorating parameter on an area reference card 16. The area reference cards are also marked with an identifier which identifies the room or other location to be identified. The color reference cards and area reference cards may then be placed in a purse or pocket and conveniently transported by the decorator. In a similar manner, color identifiers for accessory finishes may be recorded on area reference cards to correlate accessory finishes to decorating parameters for an area.

At a store, the decorator may open the wallet and turn to an area reference card, locate a color identifier for a decorating parameter and find the color reference card having the corresponding color sample. The decorator may then use the sample to select a decorating item, paint color, or the like, which matches or complements the sample. Alternatively, the decorator may see an item at a store which appeals to the decorator who opens the wallet and compares the color samples on the color reference cards to the item. If the decorator thinks the item may complement or match the color, the decorator can peruse the area reference cards to see which decorating parameter or parameters correlate to the color sample. The decorator may then evaluate whether the item may clash with other colors of other items in the room by referring to the color identifier on the area reference cards and the corresponding color samples. All the materials necessary to evaluate colors in a purchasing decision for a decorating item may be done with system 10 without requiring the inclusion of color samples not used in the areas referenced by the system.

While the present invention has been illustrated by the description of preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art.

For example, a portable computer may be used to generate colors and display them on a color screen or print a strip of color samples. By comparing the screen or printed strip to an item a color sample may be selected. The decorator may then be queried for the identification of the item matching the sample and that item identification and associated color identifier stored. In use, the decorator could provide the computer with an item identification and have the computer regenerate the corresponding color for comparison purposes. The decorator could also use the computer to request a display of colors by room and select one of the displayed colors for comparisons. Such a computer system is an implementation of the structure of the present invention for correlating selected colors to decorating parameters for efficient retrieval and reference. The use of computer memory in a conveniently transported computer is equivalent to the cards of the wallet system 10 used to record the correlation between color identifiers and decorating parameters.

What is claimed is:

1. A decorator reference system, comprising:

a color reference card;

a character, represented by first printed indicia, that is to be matched with a color sample label, said character being positioned at a first selected position on said color reference card;

a first color sample label that is operative to be placed on said color reference card;

second printed indicia being positioned at a second selected position on said color reference card, said second printed indicia instructing a user to place said first color sample label at said second selected position and said second printed indicia being located proximate to said first printed indicia, thereby placement of said first color sample label at said second printed indicia associates said first color sample label with said character represented by said first printed indicia;

an area reference card;

third printed indicia positioned on said area reference card that represents items of an area of a room to be matched with said color sample label; and fourth printed indicia positioned on said area reference card, said fourth printed indicia defining a perimeter upon which said character is to be placed and said fourth printed indicia being positioned proximate to said third printed indicia, thereby providing a decorator reference system that establishes an association between a color sample label placed at said second selected position of said color reference card and said third printed indicia that represents said items to be matched with a color sample label of said area reference card.

2. The system of claim 1 wherein:

said area reference card includes a plurality of said third printed indicia located on a face of said area reference card.

3. The system of claim 2 wherein:

said third printed indicia includes the words primary, accent, furniture, background, and accessory.

4. The system of claim 2 further comprising:

a plurality of said area reference cards, wherein each area reference card represents a different room to be decorated.

5. The system of claim 1 further comprising:

an accessory reference card having positioned thereon:

fifth printed indicia located on said accessory reference card, said fifth printed indicia including words that describe a finish on an accessory in a room and sixth printed indicia located on said accessory reference card positioned proximate to said fifth printed indicia, said sixth printed indicia being a second character that is associated with the fifth printed indicia by proximity to the fifth printed indicia, thereby placement of said sixth printed indicia on said fourth printed indicia of said area reference card provides an association between said words that describe said finish on an accessory and said items to be matched with a color sample label of said area reference card.

6. The system of claim 5 wherein:

said color reference card, said area reference card, and accessory card are provided on an accordion fold-out card.

7. The system of claim 1 further comprising:

a color palette having a plurality of color sample labels from which said color sample label is chosen.

8. The system of claim 7 wherein:

said plurality of said color sample labels are removably affixed to said color palette.

9. The system of claim 1 further comprising a binder, said binder having that at least one pocket in which said color reference card and said area reference card may be placed.

* * * * *